United States Patent [19]

Miller

[11] Patent Number: 6,086,791
[45] Date of Patent: Jul. 11, 2000

[54] ELECTRICALLY CONDUCTIVE EXOTHERMIC COATINGS

[75] Inventor: Cole F. Miller, Worthington, Ohio

[73] Assignee: Progressive Coatings, Inc., Worthington, Ohio

[21] Appl. No.: 09/152,553

[22] Filed: Sep. 14, 1998

[51] Int. Cl.$^7$ ............................... H01B 1/24; H05B 3/14
[52] U.S. Cl. .......................... 252/511; 219/209; 106/472
[58] Field of Search ..................................... 252/510, 511; 106/472; 219/209

[56] References Cited

U.S. PATENT DOCUMENTS

| | | | |
|---|---|---|---|
| 3,912,668 | 10/1975 | Neumann et al. | 260/18 PN |
| 3,923,697 | 12/1975 | Ellis | 252/506 |
| 3,999,040 | 12/1976 | Ellis | 219/543 |
| 4,064,074 | 12/1977 | Ellis | 252/506 |
| 4,624,798 | 11/1986 | Gindrup et al. | 252/62.54 |
| 4,714,569 | 12/1987 | Nishino et al. | 252/511 |
| 4,857,384 | 8/1989 | Mio et al. | 428/164 |
| 5,075,036 | 12/1991 | Parish et al. | 252/511 |
| 5,242,511 | 9/1993 | Yokoyama et al. | 148/430 |
| 5,248,517 | 9/1993 | Shrier et al. | 427/58 |
| 5,334,330 | 8/1994 | Rowlette | 252/512 |
| 5,372,749 | 12/1994 | Li et al. | 252/512 |
| 5,378,533 | 1/1995 | Ota | 428/304.4 |
| 5,407,741 | 4/1995 | Ota | 428/323 |
| 5,425,969 | 6/1995 | Wakabayashi et al. | 427/470 |
| 5,516,546 | 5/1996 | Hari et al. | 427/122 |
| 5,549,849 | 8/1996 | Namura et al. | 252/503 |
| 5,556,576 | 9/1996 | Kim et al. | 252/511 |
| 5,567,357 | 10/1996 | Wakita | 252/514 |
| 5,575,954 | 11/1996 | Mahabandi et al | 252/511 |
| 5,591,382 | 1/1997 | Nahass et al. | 252/511 |
| 5,733,480 | 3/1998 | Lee et al. | 252/511 |

*Primary Examiner*—Mark Kopec
*Attorney, Agent, or Firm*—Mueller and Smith, LPA

[57] ABSTRACT

The present invention is based on the discovery that different carbon components are required in an electrically conductive exothermic coating in order to avoid break-down and especially if a constant temperature is to be maintained by the coating (self-regulating embodiment). It has been discovered that graphite permits heat to be generated by the coating when energized with a.c. power; however, the heat tends to run away which results in a break down of the coating. Carbon, on the other hand, permits more electrical conductivity by the coating. Both the graphite and carbon should be flake-like in structure. Such a combination of flake-like graphite and carbon pigments in particles sizes of about $5\mu$ to $500\mu$ should be used. The amount of such pigments should range from about 10 and 20 weight-% based on the non-volatile solids content of the coating formulation (e.g., without solvent and other components that evolve from the coating during drying and curing operations). In order to make a self-regulating coating (i.e., a coating that will maintain a constant temperature without breakdown), non-conductive flake-like graphite pigment should be added to the formulation. In order to increase the heat emitted by the novel coatings, additional conventional spherical carbon (up to a ⅓ replacement of the flake-like particle content) can be added to the formulation.

17 Claims, No Drawings

ELECTRICALLY CONDUCTIVE EXOTHERMIC COATINGS

CROSS-REFERENCE TO RELATED APPLICATIONS

None

STATEMENT REGARDING FEDERALLY SPONSORED RESEARCH

Not applicable.

BACKGROUND OF THE INVENTION

The present invention relates to coatings that are able to evolve heat (exothermic coatings) and more particularly to exothermic coatings that utilize non-metallic particles for achieving remarkable heating characteristics.

The art has proposed "electrically conductive" coatings utilizing metallic particles for anti-static applications. Coatings based on non-metallic particles even appear in the literature. These coatings, however, typically only generate low amounts of heat and often break down the binder when asked to achieve moderate to high temperatures (say, in excess of around 100° C.). Nevertheless, the art is replete in such exothermic coatings teachings.

Nishino (U.S. Pat. No. 4,714,569) proposes to react a monomer having COOH, HN, or OH groups with a co-monomer in the presence of a peroxide catalyst to form a graft copolymer on the surfaces of the graphite and carbon black. The addition of an azo catalyst completes the reaction. Finally, a curing agent is used to form a three-dimensional network structure (i.e., paint).

Nahass (U.S. Pat. No. 5,591,382) proposes paints for charge dissipation which paints include cylindrical graphite carbon fibrils and a polymeric binder.

Mahabandi (U.S. Pat. No. 5,575,954) proposes conventional metallic and carbon conductive fillers in a unique binder to make a conductive polymer matrix.

Wakita (U.S. Pat. No. 5,567,357) proposes silver-plated copper powder to make a conductive paint.

Kim (U.S. Pat. No. 5,556,576) proposes metal, metal-coated glass, ceramics, or conductive carbon to prepare conductive coatings.

Namura (U.S. Pat. No. 5,549,849) proposes a combination of graphite particles, metal particles, and carbon black to prepare conductive coatings.

Hari (U.S. Pat. No. 5,516,546) proposes amorphous or spherical graphite, carbon fiber, metal particles, or mixtures thereof, to prepare conductive coatings. Wakabayashi (U.S. Pat. No. 5,425,969) proposes a conductive primer for polypropylene that utilizes carbon black, graphite, silver, nickel, or copper.

Ota (U.S. Pat. No. 5,407,741) proposes to use spherical graphic particles or a diameter of less than 500 $\mu$m to prepare an exothermic conductive coating.

Ota (U.S. Pat. No. 5,378,533) proposes metallic coated hollow glass spheres to prepare a conductive coating.

Li (U.S. Pat. No. 5,372,749) proposes a surface treatment for conductive copper powder.

Rowlette (U.S. Pat. No. 5,334,330) proposes to use a mixture of conductive metal oxide powder and non-conductive particles to prepare an anisotropically electrically conductive coating composition.

Shrier (U.S. Pat. No. 5,248,517) proposes to use metals, metal alloys, conductive carbides, conductive nitrides, conductive borides, and metal-coated glass spheres to prepare a nonlinear transient over-voltage protection coating.

Yokoyama (U.S. Pat. No. 5,242,511) proposes to a copper alloy powder for use in electromagnetic shielding and similar uses.

Mio (U.S. Pat. No. 4,857,384) proposes to use metal oxide powder in preparing an exothermic conducting paste.

Gindrup (U.S. Pat. No. 4,624,798) proposes to use metal-coated microparticles in preparing electrically conducting compositions.

Ellis (U.S. Pats. Nos. 3,923,697, 3,999,040, and 4,064,074) proposes a blend of graphite, manganese dioxide, and zinc oxide in preparing electrically conductive compositions.

Neumann (U.S. Pat. No. 3,912,668) proposes to use metallic carbide in preparing paints that have low electrical impedance orthogonal to the plane of the coating.

The present invention solves many of the problems encountered in the art in formulating non-metallic exothermic coatings.

BRIEF SUMMARY OF THE INVENTION

The present invention is based on the discovery that different carbon components are required in an electrically conductive exothermic coating in order to avoid break-down (that is, loss of coating properties) and especially if a constant temperature is to be maintained by the coating (self-regulating embodiment). It has been discovered that graphite permits heat to be generated by the coating when energized with a.c. power; however, the heat tends to run away which results in a break down of the coating. Carbon, black on the other hand, permits more electrical conductivity by the coating. Both the graphite and carbon black should be flake-like in structure. Such a combination of flake-like graphite and carbon pigments in particles sizes of about $1\mu$ to $500\mu$ should be used. The amount of such pigments should range from about 10 and 75 weight-% based on the non-volatile solids content of the coating formulation (e.g., without solvent and other components that evolve from the coating during drying and curing operations).

In order to make a self-regulating coating (i.e., a coating that will maintain a constant temperature without breakdown), non-conductive flake-like graphite pigment should be added to the formulation. In order to increase the heat emitted by the novel coatings, additional conventional spherical carbon (up to a ⅓ replacement of the flake-like particle content) can be added to the formulation.

The novel coatings are made conventionally by initially forming a pigment grind and then letting down the grind in additional solvent with the incorporation of additives as is necessary, desirable, or convenient. The binder should be able to withstand the expected temperatures of the coating and, thus, should be temperature resistant silicone resins, polyamide resins, bis-maleimide resins, and the like.

Advantages of the present invention include the ability to generate temperatures ranging up to around 850° C. Another advantage is the ability to produce a self-regulating temperature coating. A further advantage is that the inventive coating maintains its coating properties and can be applied, inter alia, by brush, roller coat, reverse roller coat, spray, and the like. These and other advantages will be readily apparent to those skilled in this art.

DETAILED DESCRIPTION OF THE INVENTION

The inventive paint is unique in its ability to function as a conventional coating with expected coating properties while concomitantly being electrically conductive. Such electrical conductivity further translates into the ability to generate heat (exothermic coating) to the point of being useful in a wide variety of applications, such as, for example, heating of floors, walls, ceilings, roofs, and gutters. Further uses include preheating of engine oils in transport vehicles and power plants, local heating of batteries and auxiliary systems, heating cars and tankers carrying oil and other liquids, coal carrying vehicles, and for deicing of aircraft wings. Additional uses include warming of components subjected to cold temperatures in use, heating of highways and other outdoor structures including, for example, airplane wing de-icing. Yet other uses include home/commercial appliances (dryers, irons, clothes presses, space heaters, cooking surfaces such as stoves, hot plates, woks, toasters, water heaters, coffee makers, furnaces, hot tubes, commercial/industrial/home ovens, etc.), medical equipment, as a replacement for resistant heating devices, and the like. Surely the foregoing list is merely illustrative and a wide variety of additional uses will become apparent based on the disclosure set forth herein.

In order to achieve such remarkable heating capability, the present invention relies on non-metallic electrically conductive carbon black pigments that are flake-like in structure. Such flake-like carbon pigments can be highly conductive, moderately conductive, and even non-conductive. For generating heat, however, carbon (again, preferably flake-like in structure) is included in the formulation. Conventional carbon (spherical, shell-like, needle-like, or fiber-like) can be substituted for about ⅓ of the carbon content in order to provide additional heating capability. In order to prevent the coating from run-away heating, however, non-conductive flake-like carbon should be added to the formulation. Regulation of the heating (exothermic generation of heat) is provided thereby. Formulations tested to date have exhibited their exothermic characteristics for several months at a defined stable temperature.

The flake-like carbon pigments should range in particle size from about 5 to 500μ. While the amount of such flake-like carbon pigments can be as little as 1 wt-%, amounts up to 75 wt-% can be envisioned, depending upon intended use and other factors. Typically, the more flake-like carbon pigment present, the more conductive the coating is. Measurements have revealed the ability to generate between 1.5° and 2.1° F. heating from the inventive coating for each watt of power inputted to the coating. Moreover, heating can be quite rapid. Water can be boiled in a matter of as little as 60 seconds in a 32 ounce glass dish.

Another unique feature is the ability of the coating to become scratched, yet still maintain is electrical conductivity and exothermic properties. This makes repair of the coating facile and should prove to be an important characteristic for commercial implementation of the present invention.

Since the coating generates such high quantities of heat, the binder used necessarily must be able to withstand such elevated temperatures. Thus, heat-stable resins should be used including, for example, acrylics, alkyds, cellulosics, epoxies, fluoro-plastics, ionomers, natural rubber, nylons, phenolics, polyamides, polybutadiene, polyesters, polyimides, polypropylene, polyurethanes, silicone resins, silicone rubber, styrene-butadiene; nitrile rubber, polysulphide rubber, vinyl-ethylene, polyvinyl acetate, silicates and polysilicates; hydraulic setting Portland cement, sodium aluminate and gypsum (Plaster of Paris); glass compositions, including glass fruits; ceramic and refractory compositions; and minerals, such as bentonites, and the like.

Of importance is that such resins have the ability to withstand elevated temperatures without loss of integrity of the paint. Those skilled in the resin arts will readily be able to provide a wide variety of such temperature-stable resins. See, for example, Solomon, *The Chemistry of Organic Film Formers*, Robert E. Krieger Publishing Company, Huntington, N.Y. (1977), the disclosure of which is expressly incorporated herein by reference.

Other additives are incorporated into the formulation in conventional fashion. These additives include, inter alia, opacifying pigments and inert extenders such as, for example, titanium dioxide, zinc oxide, clays such as kaolinite clays, silica, talc, and the like. Additionally, the coating composition can contain corrosion inhibiting pigments, plasticizers, pigment suspending agents, flow leveling agents, catalysts, drying agents, surfactants, tinctorial pigments, and a wide variety of other conventional additives.

The inventive paint can be applied to a substrate by direct roll coat or curtain coating with or without a knife, reverse roller coat, atomized application, or like conventional techniques. Cure of the coating can be simple air-drying or it can involve baking at a temperature and for a time for cure of the binder system employed, solvents used, and like factors well known to those in the coatings field.

The following examples show how the present invention has been practiced. They should be construed as illustrative of the invention and not a limitation of it. In this application, all references cited are expressly incorporated herein by reference.

IN THE EXAMPLES

The following general procedure was used in compounding the formulations reported in the examples:

Grind the pigments and fillers in a high-speed blender set at HIGH speed for 5 minutes.

In a separate vessel, blend the binder and solvent at HIGH for 1 minute.

Slowly add the pigment/filler mixture to the binder/solvent mixture at LOW speed in a blender over a 2–3 minute time period, then advance the speed to MEDIUM for 2 minutes and then HIGH speed for 1 minute.

Store coating in a glass container with a sealing lid.

The electrically conductive exothermic coating then was formed as follows:

Apply copper foil electrodes (0.25 in. wide×2 mil thick× desired length) to substrate to be coated along opposite edges of the surface to receive the coating with adhesive (self-adhesive backing has been used).

Clean and dry the surface to be coated.

Mask the surface of the substrate to be coated such that the electrodes and the area between the electrodes will be able to receive the coating. Be sure to mask the ends of the electrodes so that the copper foil is available to be soldered to a power source.

Apply coating using a conventional air spray gun using approximately 3 passes to produce a uniform coating of about 25 micrometers.

Let the applied paint film air dry for about 2 hours or oven bake at 200° F. for 20 minutes.

Solder electrical wire leads to the ends of the copper electrodes.

Connect the leads to a variable electrical source (0–120 volts a.c@ 1–5 amps).

Slowly apply electrical current to the coating, monitoring thermal characteristics.

The following ingredients were used in compounding the formulations tested:

| | |
|---|---|
| Printex XE-2 Carbon Pigment | A highly conductive carbon black pigment, MW of 12, flake-like structure, 1,000 µM grind level, MSDS #1017, Degussa Corporation |
| Printex XA Carbon Pigment | A very high conductivity carbon black pigment, MW of 12, flake-like structure, 92% cystallinity, 250 µM grind level, melting point of 11,000° C., Degussa Corporation |
| Printex L6 Carbon Pigment | A semi-conductive carbon pigment, MW of 12, flake-like structure, 1,000–1,500 µM grind level, MSDS #1019, Degussa Corporation |
| Printex 200 Carbon Pigment | A non-conductive carbon pigment, MW of 12, flake-like structure, 1,000–1,500 µM grind level, MSDS #1019, Degussa Corporation |
| Graphite Pigment | Purified natural graphite, 99.8% carbon content, 0.2% ash level, 125 mesh grind level, 325 mesh (US) particle size, MSDS #2935K, Superior Graphite Co. |
| Silicon Carbide | HSC Silicone Carbide, grade 059, 66% crystalline structure, MSDS 107a, Superior Graphite Co. |
| Silicon Carbide | AE60, Union Carbide Corporation |
| Silicone Resin | "Flame Control" Kem Hi-Tem Coating, No. 850 Series, MSDS #7.06b, high temperature rating (>600° F.), silicone alkyd resin reduced in xylene, Sherwin Williams Co. |
| Silicone Resin | BE76 silicone alkyd resin (<35% solids) in xylol solvent, Ashland Chemical Company |

Example 1

A coating was compounded from the following ingredients:

TABLE 1

| Ingredient | Amount (g) |
|---|---|
| Graphite pigment | 20 |
| Printex XE carbon pigment | 15 |
| BE 76 Silicone resin | 70 |
| 900A Flame Control silicone resin | 200 |
| Xylene | 100 |
| % Pigment | 11.5% |

The resulting coating on glass (Pyrex® brand) provided quick heating of 32 oz of water at 0.9 amps (up to 150°–210° F.) and was stable for several days. There was, however, some spot break-down of the coating.

Example 2

A coating was compounded from the following ingredients:

TABLE 2

| Ingredient | Amount (g) |
|---|---|
| Graphite pigment | 10 |
| Printex L6 carbon pigment | 30 |
| 850 Flame Control silicone resin | 200 |
| Xylene | 100 |
| % Pigment | 16.7% |

The resulting coating on glass (Pyrex®) was highly electrically conductive (110 volts AC) and provided fairly uniform and rapid heating to the point of run-away as the coating was not regulated.

Example 3

A coating was compounded from the following ingredients:

TABLE 3

| Ingredient | Amount (g) |
|---|---|
| Graphite pigment | 10 |
| Printex XE-2 carbon pigment | 20 |
| Printex L6 carbon pigment | 5 |
| 850 Flame Control silicone resin | 220 |
| Xylene | 110 |
| % Pigment | 13.7% |

The resulting coating on glass (Pyrex®) provided very rapid and uniform heating, high electrical conductivity, and was stable for 10 days at 1.7 amps and 110 volts AC.

Example 4

A coating was compounded from the following ingredients:

TABLE 4

| Ingredient | Amount (g) |
|---|---|
| Graphite 2939K pigment | 15 |
| Printex XE-2 carbon pigment | 25 |
| 850 Flame Control silicone resin | 400 |
| Xylene | 70 |
| % Pigment | 7.8% |

A metal Broaster (metal pan with porcelain coating) pan measuring about 12 cm×20 cm was coated with a coating of the formulation set forth above at a coating thickness of about 35–55µ. Leads were connected to the dried coating as described above and then to a POWERSTAT variable automatic transformer (Warner Electric). An Extech 382060 Clamp on power watt meter was employed in the circuit to measure power and a Fluke 52 K/J Infrared Thermometer was used to measure the temperature of the coated Broaster pan. Testing as reported below was conducted at an ambient temperature of about 84.2° F.

All temperatures reported in this example were obtained in less than 15 minutes after initiation of power to the coating and were sustained for at least 10 minutes. Each voltage test was conducted by starting at ambient temperature and then applying current to obtain the maximum steady-state temperature for that power setting. Thereafter, the sample was cooled to ambient temperature and new power settings were initiated. The data recorded are set forth below.

TABLE 5

| VOLTS | AMPS | TEMPERATURE (° F.) | WATTS (Calculated) |
|---|---|---|---|
| 5 | 0.1 | 88.2 | 0.5 |
| 10 | 0.2 | 96.0 | 2 |
| 15 | 0.3 | 114.8 | 4.5 |
| 20 | 0.4 | 132.8 | 8 |
| 25 | 0.6 | 158.2 | 15 |
| 30 | 0.8 | 177.8 | 24 |
| 35 | 1.0 | 211.8 | 35 |
| 40 | 1.4 | 258.4 | 56 |
| 45 | 2.1 | 337.4 | 94 |
| 50 | 2.6 | 400.2 | 130 |
| 60 | 3.2 | 479.4 | 192 |

At a power setting of 50V and 60 VAC the surface started to smoke. The surface temperature was measured at 360° F.

at this event. It was believed that the smoke was evidence that the coating was being completely cured. This belief is based on the fact that hugh temperature heating of the binder is necessary in order for the binder to completely cool. Since facilities to accomplish such baking were not available, it was assumed that the temperature excursions encountered during the electrical testing of the coating substituted for curing backing.

This belief was confirmed by cooling the coated Broaster pan and then reenergizing the POWERSTAT unit. The reheat data was determined to follow the data reported above.

Example 5

The coating of Example 5 was used in this experiment also. The same experimental procedure was followed, except that the ambient temperature was 70.2° F. and the coating was applied to a PYREX brand glass pan with a surface area measuring about 11.4 cm in by 17.1 cm. The data recorded are set forth below.

TABLE 6

| VOLTS | AMPS | TEMPERATURE (° F.) | WATTS (Calculated) |
| --- | --- | --- | --- |
| 10 | 0.1 | 82.0 | 1 |
| 20 | 0.1 | 106.2 | 2 |
| 30 | 0.2 | 141.5 | 6 |
| 40 | 0.3 | 192.4 | 12 |
| 50 | 0.8 | 290.2 | 40 |
| 60 | 1.4 | 415.2 | 84 |

At a surface temperature of about 358.4° F., the surface started to smoke. It was believed that the smoke was evidence that the coating was being completely cured. This belief is based on the fact that high temperature heating of the binder is necessary in order for the binder to completely cool. Since facilities to accomplish such baking were not available, it was assumed that the temperature excursions encountered during the electrical testing of the coating substituted for curing baking.

This belief was confirmed by cooling the coated PYREX dish and then reenergizing the POWERSTAT unit. The reheat data again was determined to replicate the data reported above.

Example 6

A coating was compounded from the following ingredients:

TABLE 7

| Ingredient | Amount (g) |
| --- | --- |
| Graphite 2939K pigment | 20 |
| L6 Carbon | 25 |
| 850 Flame Control silicone resin | 270 |
| Xylene | 60 |
| % Pigment | 12% |

A metal Broaster pan measuring 13 cm×30 cm was coated with a thin (about 35–55µ) coating of the formulation set forth above and testing conducted as described in the foregoing examples, except that each increased power setting was established immediately after the previous temperature had been stabilized (i.e., the pan was not cooled before each succeeding run). The following data were recorded:

TABLE 8

| VOLTS | AMPS | TEMPERATURE (° F.) | WATTS (Calculated) |
| --- | --- | --- | --- |
| 5 | 0.1 | 86 | <0.5 |
| 10 | 0.0 | 88 | <1.0 |
| 15 | 0.0 | 90 | <1.5 |
| 20 | 0.0 | 94 | <2.0 |
| 25 | 0.0 | 97 | <2.5 |
| 30 | 0.1 | 100 | 3.0 |
| 35 | 0.1 | 105 | 3.5 |
| 40 | 0.1 | 110 | 4.0 |
| 45 | 0.1 | 117 | 4.5 |
| 50 | 0.1 | 125 | 5.0 |
| 60 | 0.1 | 131 | 6.0 |
| 70 | 0.1 | 136 | 7.0 |
| 80 | 0.1 | 143 | 8.0 |
| 90 | 0.1 | 147 | 9.0 |
| 100 | 0.1 | 153 | 10.0 |

These data again demonstrate the efficacy of the present invention.

Example 7

The procedure of Example 7 was repeated for a PYREX brand glass dish measuring about 18 cm×10 cm with an ambient temperature of about 86° F. The coating initially was dried (cured) by subjecting it to 60 V (140° F.) for 16 hours. The following data then were recorded.

TABLE 9

| VOLTS | AMPS | TEMPERATURE (° F.) | WATTS (Calculated) |
| --- | --- | --- | --- |
| 5 | 0.0 | 80 | <0.5 |
| 10 | 0.0 | 87 | <1.0 |
| 15 | 0.0 | 91 | <1.5 |
| 20 | 0.0 | 95 | <2.0 |
| 25 | 0.1 | 97 | 2.5 |
| 30 | 0.1 | 108 | 3.0 |
| 35 | 0.1 | 113 | 3.5 |
| 40 | 0.1 | 121 | 4.0 |
| 45 | 0.1 | 125 | 4.5 |
| 50 | 0.1 | 127 | 5.0 |
| 60 | 0.1 | 137 | 6.0 |
| 70 | 0.1 | 152 | 7.0 |
| 80 | 0.1 | 170 | 8.0 |
| 90 | 0.1 | 199 | 9.0 |
| 100 | 0.1 | 272 | 10.0 |

Again, the excellent heating characteristics of the inventive coating are revealed.

Example 8

A coating composition was compounded from the following ingredients:

TABLE 10

| Ingredient | Amount (g) |
| --- | --- |
| Graphite 2939K pigment | 30 |
| L6 Carbon | 15 |
| 850 Flame Control silicone resin | 200 |
| Xylene | 100 |
| % Pigment | 13% |

The coating was drawn down on a Broaster pan as described in Example 4, above. As an initial test, the coating was able to heat a beaker containing 500 cc of water to boiling in 60 minutes 40 seconds at 4.25 amp at 110 VAC.

Next, the coating was tested (85° F. ambient temperature) for its electrical conductivity properties with the following data being recorded:

TABLE 11

| VOLTS | AMPS | TEMPERATURE (° F.) |
|---|---|---|
| 25 | 0.6 | 140 |
| 30 | 0.75 | 175 |
| 35 | 0.85 | 190 |

Long term evaluation of the electrical properties of the coating then obtained with the following data being recorded:

TABLE 12

| ELAPSED TIME (Days) | VOLTS | AMPS | TEMPERATURE (° F.) |
|---|---|---|---|
| 11 | 40 | 1.0 | 240 |
| 31 | 40 | 1.5 | 245 |
| 33 | 40 | 1.5 | 250 |
| 36 | 40 | 1.6 | 258 |
| 38 | 40 | 1.8 | 250 |
| 42 | 40 | 1.8 | 275 |
| 45 | 40 | 1.9 | 278 |
| 55 | 40 | 1.8 | 300 |

*The test was stopped between day 45 and day 55, and then resumed on Day 55.

This data shows that the inventive coating when held at constant voltage, displaced only modest increases in power consumption (wattage) and temperature recorded over an extended time period. Moreover, the stability of the coating was maintained even after 10 days of non-use with reestablishment of the heating profile then being accomplished.

Finally, a ceramic disk measuring about one-half the size of the coated Broaster pan was placed on top of the coating and the voltage reestablished. After 1.5 hours, the coating measured at 245° F. This data shows that the coating does not overheat when an object is placed over it.

Example 9

A coating was compounded from the following ingredients:

TABLE 13

| Ingredient | Amount (g) |
|---|---|
| Graphite 2939K pigment | 15 |
| XE2 CARBON | 25 |
| Kem Hi Temp | 400 |
| Xylene | 70 |
| % Pigment | 7.8% |

The coated PYREX dish was filled with 2 quarts of water. The surface was placed on a hot plate and 110 V was applied with a maximum of 3V. This low temperature formula heated the water to 147° F. for over 8 weeks. The water temperature did not vary more than 1° F. for the entire two months.

The water would evaporate every 8 hours, so constant vigilance was taken to keep the water levels up in the dish. The experiment finally was terminated when the operator let the dish dry out for a while and the hot dish exploded when water was re-established in the hot dish.

I claim:

1. A non-metallic electrically conductive coating composition effective in emitting heat without break-down when connected to a source of electricity, which comprises:
   (a) a binder;
   (b) electrically conductive flake carbon black of particle size between about 5 and 500μ;
   (c) electrically conductive flake graphite of particle size between about 5 and 500μ,
   (d) a volatile solvent;
   wherein the weight amount of (b) and (c) together ranges from between about 10 and 75 weight-% based on the non-volatile solids content of the coating composition.

2. The electrically conductive coating composition of claim 1, wherein the weight amount of (b) and (c) together ranges from between about 10 and 20 weight-% based on the on-volatile solids content of the coating composition.

3. The electrically conductive coating composition of claim 1, therein up to about one-third of the flake carbon black (b) can be replaced with non-flake carbon.

4. The electrically conductive coating composition of claim 1, which additionally comprises:
   (e) non-electrically conductive flake carbon of particle size between about 5 and 500μ.

5. The electrically conductive coating composition of claim 1, wherein each of said carbon black (b) and said graphite (c) is present in an amount of at least about 1 wt-%.

6. The electrically conductive coating composition of claim 1, wherein said binder is one or more of an acrylic, an alkyd, a cellulosic, an epoxy, a fluoro-plastic, an ionomer, a natural rubber, a nylon, a phenolic, a polyamide, a polybutadiene, a polyester, a polyimide, a polypropylene, a polyurethane, a silicone resin, a silicone a natural rubber, a styrene-butadiene; a nitrile rubber, a polysulphide rubber, a vinyl-ethylene, a polyvinyl acetate, a silicate or polysilicate; a hydraulic setting Portland cement, a sodium aluminate or gypsum (Plaster of Paris); a glass composition; a ceramic or refractory composition; or mineral.

7. A dried film of the electrically conductive coating composition of claim 1.

8. A dried film of the electrically conductive coating composition of claim 2.

9. A dried film of the electrically conductive coating composition of claim 3.

10. A dried film of the electrically conductive coating composition of claim 4.

11. A dried film of the electrically conductive coating composition of claim 5.

12. A dried film of the electrically conductive coating composition of claim 6.

13. A method for generating heat, which comprises:
   (a) forming a dried film on a substrate from a non-metallic coating composition which comprises:
      (1) a binder;
      (2) electrically conductive flake carbon black of particle size between about 5 and 500μ;
      (3) electrically conductive flake graphite of particle size between about 5 and 500μ,
      (4) a volatile solvent;
      wherein the weight amount of (b) and (c) together ranges from between about 10 and 75 weight-% based on the non-volatile solids content of the coating composition,
   (b) attaching electrodes to said dried film;
   (c) connecting said electrodes to a source of electricity; and
   (d) energizing said source of electricity.

14. The method of claim 13, wherein said dried film is formed from a coating composition in which the weight amount of (b) and (c) together ranges from between about 10 and 20 weight-% based on the non-volatile solids content of the coating composition.

15. The method of claim 13, wherein said dried film is formed from a coating composition in which up to about one-third of the flake carbon (2) can be replaced with non-flake carbon.

16. The method of claim 13, wherein said dried film is formed from a coating composition which additionally comprises non-electrically conductive flake-like carbon of particle size between about 5 and 500μ.

17. The method of claim 13, wherein said dried film is formed from a coating composition wherein said binder is one or more of an acrylic, an alkyd, a cellulosic, an epoxy, a fluoro-plastic, an ionomer, a natural rubber, a nylon, a phenolic, a polyamide, a polybutadiene, a polyester, a polyimide, a polypropylene, a polyurethane, a silicone resin, a silicone a natural rubber, a styrene-butadiene; a nitrile rubber, a polysulphide rubber, a vinyl-ethylene, a polyvinyl acetate, a silicate or polysilicate; a hydraulic setting Portland cement, a sodium aluminate or gypsum (Plaster of Paris); a glass composition; a ceramic or refractory composition; or mineral.

* * * * *